United States Patent
Coulter et al.

(10) Patent No.: US 8,254,625 B2
(45) Date of Patent: Aug. 28, 2012

(54) AUTOMATED SERVICE MEASUREMENT, MONITORING AND MANAGEMENT

(75) Inventors: Robert Craig Coulter, Apollo, PA (US); Ralph Gross, Pittsburgh, PA (US); Kerien W. Fitzpatrick, Sewickley, PA (US)

(73) Assignee: HyperActive Technologies, Inc., Pittsburgh, PA (US)

( * ) Notice: Subject to any disclaimer, the term of this patent is extended or adjusted under 35 U.S.C. 154(b) by 1027 days.

(21) Appl. No.: 11/933,655

(22) Filed: Nov. 1, 2007

(65) Prior Publication Data

US 2008/0107304 A1 May 8, 2008

Related U.S. Application Data

(60) Provisional application No. 60/856,175, filed on Nov. 2, 2006.

(51) Int. Cl.
| | |
|---|---|
| *G06K 9/00* | (2006.01) |
| *G06K 9/62* | (2006.01) |
| *G05B 23/02* | (2006.01) |
| *G08B 23/00* | (2006.01) |
| G08G 1/097 | (2006.01) |
| G08G 1/01 | (2006.01) |
| G08G 1/14 | (2006.01) |
| *B60Q 1/48* | (2006.01) |

(52) U.S. Cl. ........ 382/103; 382/100; 382/224; 382/225; 340/3.1; 340/3.43; 340/573.1; 340/931; 340/932.2; 340/933

(58) Field of Classification Search .................. None
See application file for complete search history.

(56) References Cited

U.S. PATENT DOCUMENTS

| | | | | |
|---|---|---|---|---|
| 4,392,119 | A * | 7/1983 | Price et al. | 705/32 |
| 4,530,067 | A | 7/1985 | Dorr | |
| 4,935,720 | A | 6/1990 | Kalfoun | |
| 4,951,032 | A * | 8/1990 | Langsam | 340/522 |
| 4,990,890 | A * | 2/1991 | Newby | 340/426.18 |
| 5,132,914 | A | 7/1992 | Cahlander et al. | |
| 5,172,328 | A | 12/1992 | Cahlander et al. | |
| 5,602,730 | A | 2/1997 | Coleman et al. | |
| 6,026,372 | A | 2/2000 | Savage | |
| 6,580,360 | B1 * | 6/2003 | McKee et al. | 340/286.09 |
| 6,619,593 | B1 * | 9/2003 | Callahan | 246/115 |
| 6,842,719 | B1 | 1/2005 | Fitzpatrick et al. | |
| 6,982,388 | B2 * | 1/2006 | Kasinoff | 177/2 |
| 7,161,472 | B2 * | 1/2007 | Strumolo et al. | 340/436 |
| 7,423,552 | B2 * | 9/2008 | Sherman et al. | 340/933 |
| 2002/0036691 | A1 * | 3/2002 | Franklin | 348/143 |
| 2003/0074239 | A1 | 4/2003 | Hoffman et al. | |
| 2004/0153377 | A1 * | 8/2004 | Dallman | 705/27 |
| 2004/0260513 | A1 | 12/2004 | Fitzpatrick et al. | |
| 2005/0154560 | A1 * | 7/2005 | Fitzpatrick et al. | 702/182 |
| 2006/0152349 | A1 * | 7/2006 | Ratnakar | 340/426.1 |
| 2006/0218057 | A1 | 9/2006 | Fitzpatrick et al. | |
| 2007/0007331 | A1 * | 1/2007 | Jasper et al. | 235/379 |

* cited by examiner

*Primary Examiner* — Tom Y Lu
*Assistant Examiner* — Thomas Conway
(74) *Attorney, Agent, or Firm* — The Webb Law Firm

(57) ABSTRACT

In a method and system of service management, a radiative sensor is positioned to observe an area of interest. At least one frame of data of the area of interest is electronically acquired from the radiative sensor. The acquired frame of data is electronically processing to determine the presence or absence of at least one object in the area of interest. Based on the presence or absence of the object in the area of interest, (1) an alert is electronically caused to be generated in response to also electronically detecting another object in another area of interest, and/or (2) a timer is electronically caused to initiate or terminate counting a period of time.

8 Claims, 7 Drawing Sheets

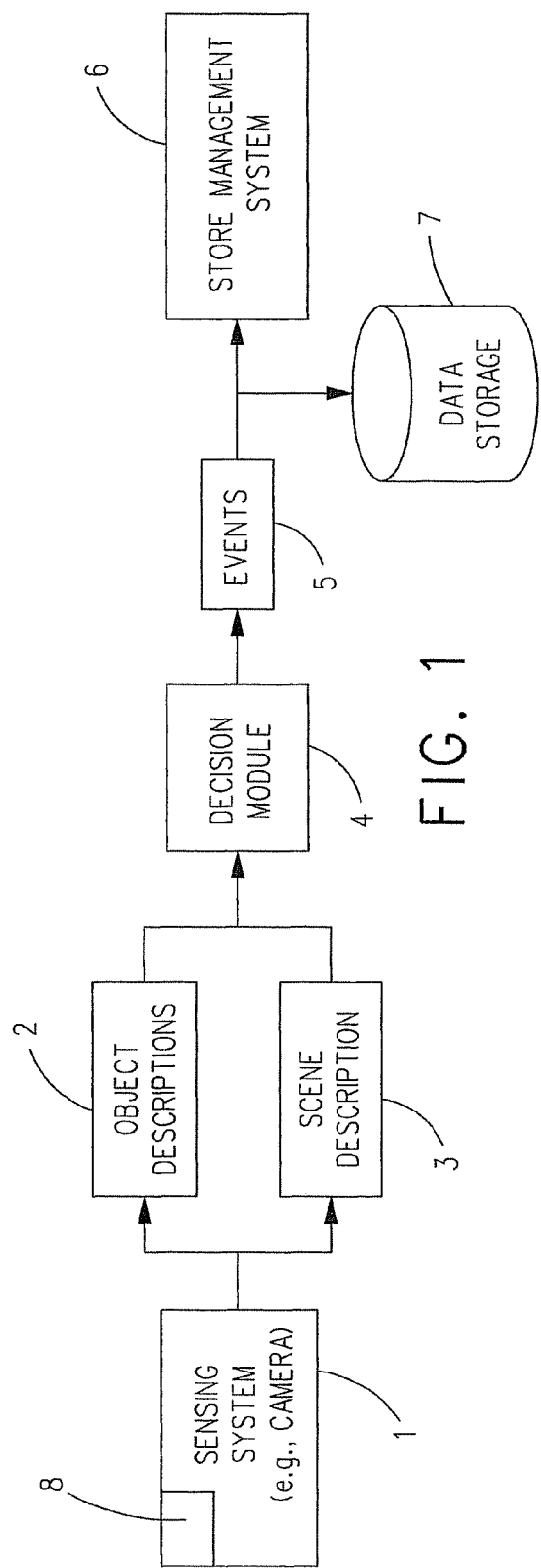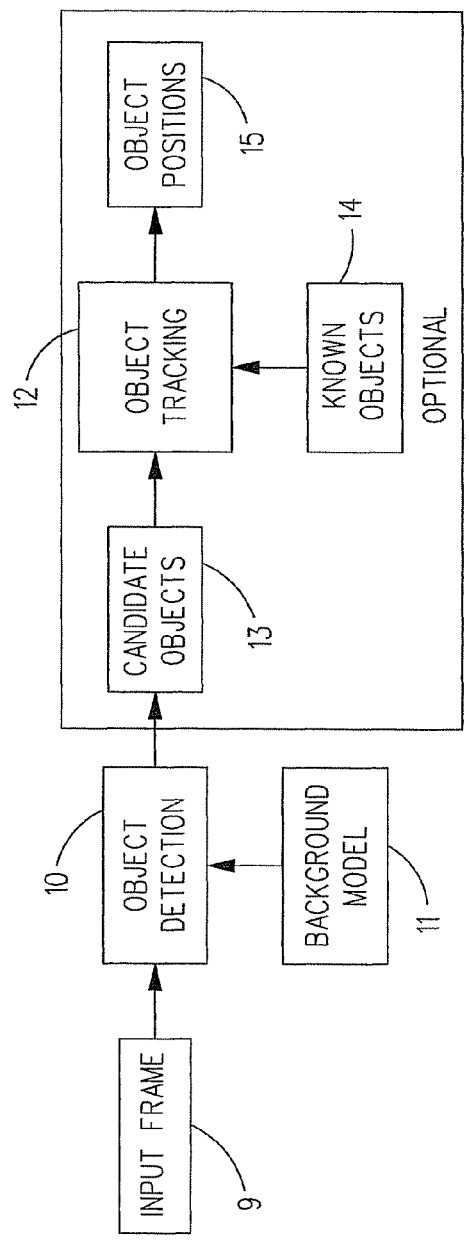

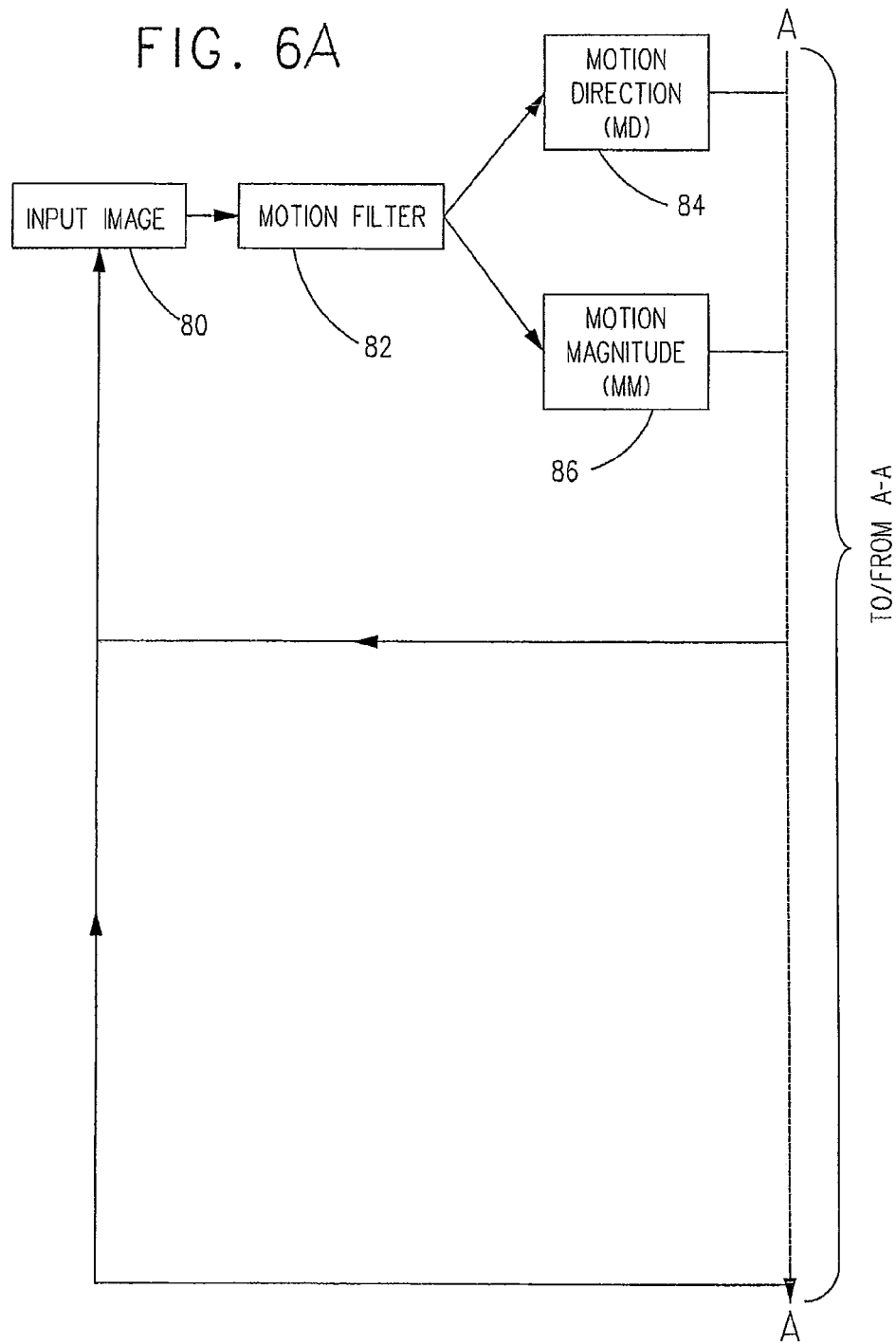

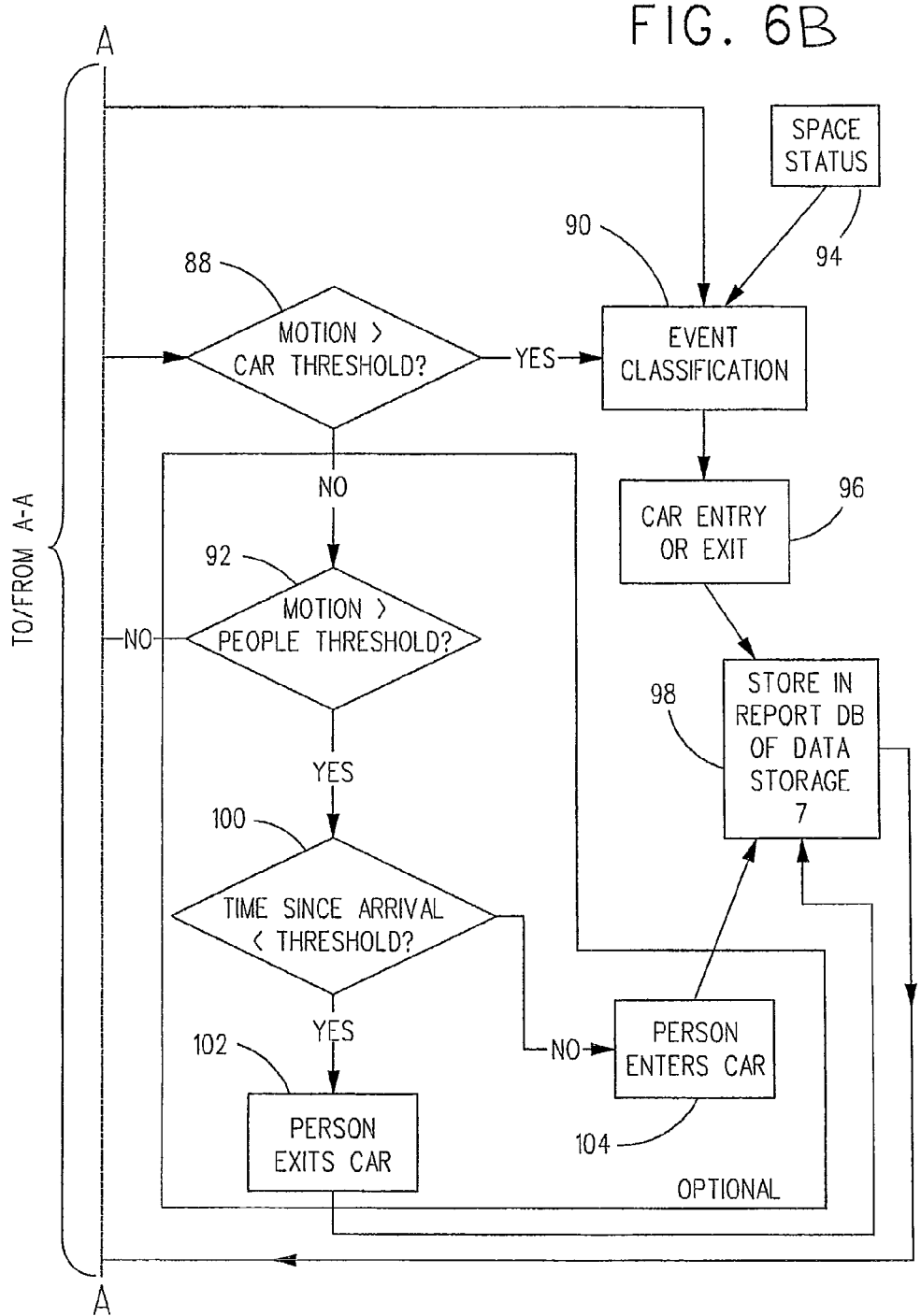

AUTOMATED SERVICE MEASUREMENT, MONITORING AND MANAGEMENT

CROSS REFERENCE TO RELATED APPLICATION

This application claims priority from U.S. Provisional Patent Application No. 60/856,175, filed Nov. 2, 2006, which is incorporated herein by reference.

BACKGROUND OF THE INVENTION

1. Field of the Invention

The present invention is directed to automated service management, especially in connection with quick-service restaurants.

2. Description of Related Art

The quick-service restaurant (QSR) industry emphasizes rapid customer service in their service queues. Queue length and total wait time impact consumer satisfaction in several ways:

Unacceptably Long Wait Times: Repeated "waited too long" experiences create a negative bias against that brand, resulting in a potential loss of repeat business;

Walk-offs or Drive-offs: If the customer feels that he or she is waiting "too long", they may leave the queue, resulting in an immediate loss of sales;

Walk-bys or Drive-bys: If a customer approaches an establishment where the queue is perceived to be "too long" then the customer may decide against choosing that brand, resulting in a lost sales opportunity; and Inattentive Service Personnel: A customer may reach the head of the queue and then be forced to wait because there are no retail employees available to provide service. Lack of attention to the customer is felt to create a more heightened negative perception of the retail establishment's service quality, resulting in a potential loss of repeat business.

Human management is the state-of-the-art in the QSR industry. Human managers are responsible for overseeing the staffing, labor allocation, attentiveness, and service quality of their service personnel.

The effectiveness of human managers is highly constrained by the volume of restaurant traffic. As traffic volumes increase, the ability of a human manager to simultaneously measure service needs and monitor service personnel greatly diminishes. In particular, humans suffer from an inability to simultaneously track the state of several targets—i.e., customers who need service or employees who provide those services. Thus the traffic volumes normally seen in retail establishments, with dozens of customers and employees, are often too high to enable service measurement tasks to be performed reliably by hand.

Human managers are supported by a number of technology solutions that provide measurements of service times; however, there are no known solutions for automatically monitoring service personnel, nor are there general automated service management systems. Most service time measurement systems focus on measuring drive-through times in a manner discussed hereinafter.

Retail industries note that their ability to provide timely service is often put at risk by lack of employee attention to customer needs. Customer needs vary considerably, but include:

Distracted Service Personnel—A person entering a restaurant may in fact be the only person in line, but be forced to wait for 90 seconds before a front counter service person, engrossed in an administrative task, notes that there is a customer requiring attention. In another example, a person may pull into a restaurant property to pick-up a take-out order, enter the restaurant and wait several minutes for someone to notice them at the front-counter register; and Absent Service Personnel—A person may approach a restaurant ordering station to find that there are no cashiers at their stations—then wait several minutes until a cashier returns. In another example, a person may be waiting for a restaurant to cook their hamburger, only to discover that the cook left the kitchen area and is unaware that there is an order.

In each of these examples, the industry suffers from an inability to ensure that service providers (cooks, cashiers, etc) are both in-position and aware of a service need (customer order, pick-up customer, etc.) in a timely fashion.

The industry's ability to deliver high quality service to their customers is limited by the capacity of service managers to oversee their service management staff in real-time—i.e., at the moment that problems are actually occurring and can therefore be quickly resolved. A service manager's attention is split across many duties. At any moment in time, the service manager may be calling employees to find replacement staff for the day; filing administrative reports like workers compensation claim responses; ordering additional product; interviewing new hires; etc. Each of these tasks competes with and takes away from the amount of attention that the service manager can focus on service.

There are many potential events that might warrant notification to the service manager or crew, including:

Excessive Wait Time—Alert the manager in the event that a customer's wait time has grown excessive. This alarm might include information such as the particular queue that contains the customer; their position in line (i.e., head of the queue, end of the queue, etc.); the actual elapsed time in line; etc.;

Growing Wait Time—Alert the manager in the event that successive customer's wait times are growing—i.e., the (n+1)th customer's wait time is larger than the nth customer's;

Stopped Queue—Alert the manager if a queue fails to move forward after a certain time. For example, in a drive-through, this might indicate the need to ask the first vehicle in the queue to pull to the side because they are waiting for a food product to be completed;

Growing Queue—Alert the manager if the queue is growing. This alert might indicate that the queue has either grown beyond a certain length (e.g. 5 vehicles in the drive-through) or is growing faster than a certain rate (e.g. the addition of more than three vehicles within a 1 minute period);

Unattended Station—Alert the manager if a service employee has left their station unattended. Alternatively, provide an alert only if a customer arrives at the unattended station; and Excessively Unattended Station—Monitor each station to determine if it is habitually unattended, perhaps modulated by the requirement that it is unattended while a customer is waiting.

The following applications have been identified as requiring human management in the QSR environment:

1. Drive-Through Service—In this application, vehicles queue up at a drive-through.

2. Counter-Service—In this application, patrons queue up at a counter service area.

3. Pull-up or Take-Out Service—In this application, vehicles drive into designated parking spaces in order to wait for delayed food or to pick-up take-out food.

Drive-Through Service:

In drive-through service environments, service managers operate volume businesses, where customers tend to seek service at specific times of the day. For example, restaurants see heavy traffic volumes at meal-times. The drive-through service manager seeks to maximize their throughput during heavy-volume periods in order to capture as many sales as possible.

Generally, a drive-through service manager's service quality metrics focus on helping them to capture as many sales opportunities as possible. Some of these metrics include:

Average Service Time (AST)—By minimizing the average amount of time that each service transaction consumes, more customers can be served during high-volume periods. AST management focuses on creating service opportunities in a limited period of time. This metric is frequently most important to drive-through managers because it drives top-line revenue opportunity;

Total Service Time—Drive-through service managers attempt to minimize the total amount of time that consumers spend waiting for service. The QSR industry believes that excessively long service times frustrate customers, damage the brand, and cost them repeat business; and Queue Length—The drive-through queue length is the principal information available to potential drive-through consumers to decide whether they will purchase from a retail establishment—if the queue is too long, consumers will drive-by in search of a competitor with a shorter anticipated wait time. Long queue lines cause retail businesses to lose sales opportunities by scaring off customers.

The drive-through service management problem is therefore to manage both the customer's perception of their anticipated wait time (i.e., queue length) and the actual customer wait time to minimize lost sales opportunities (drive-bys and disgruntled customers) while maximizing today's throughput (top-line revenues).

Service managers can improve their service performance in two ways—first, managing the allocation of labor resources assigned to the service queue and second, managing the efficiency of those labor resources.

To this end service managers seek to schedule the fewest number of employees possible (i.e., control their labor costs) while meeting their service targets (i.e., speed-of-service, queue length, etc.). This labor allocation task requires managers to determine the crew size that will be on-hand each hour of the working day and therefore defines the maximum labor with which they can achieve their goals;

Moreover, service managers assign individual service tasks (i.e., cashier, runner, teller, etc.) to the members of that days work crew. Individual industries vary in the flexibility with which crew members can be reassigned tasks. Crew members may also require specific skills, training, or certification in order to perform certain tasks. This second labor allocation task requires managers to map crew members onto labor assignments in a way that they feel will maximize the efficiency of the total crew;

Lastly, service managers oversight employee performance in real-time so that they can coach, prod, push, encourage, identify and remove hurdles, respond to unusual events, and otherwise increase the overall crew's ability to execute against their tasks;

The state-of-the-art in drive-through service measurement is the drive-through timer, commonly employed in the quick-service restaurant industry. The drive-through timer times automotive traffic between two points—usually the order board and the pick-up window, although some systems also time from a third point, often in advance of the order board.

Drive-through timers operate on one of two principals. The first type is operated by employees through the point-of-sale (i.e., electronic cash register) system and time traffic between the order board and the pick-up window. A timer is started when the order-taker (an employee) presses the first button to enter a new drive-through order into the POS. The timer is stopped when the order-server (another employee) presses a "served" button on an apparatus mounted near the pick-up window. The second employee is trained to press the "served" button when they deliver the food through the pick-up window.

The second type automatically starts and stops timers when the vehicle drives over an electromagnetic loop sensor buried in the drive-through pavement. Such systems may be stand-alone, or may operate in conjunction with (i.e., provide input to) the point-of-sale systems described above—e.g. replace the first button push with a loop sensor to start the timer.

Drive-through timers of the first type (i.e., employee-driven systems) are vulnerable to employee cheating. Employees who are driven to achieve an average service time target can improve their times by pushing the "serve" button before they have actually served the food to the customer. Thus, the recorded time no longer actually corresponds to the physical events that the drive-through timer purports to measure—i.e., the time that elapses between the start of the customer order and the moment that the customer receives food.

Drive-through timers of the second type (i.e., loops in the ground) are limited in their measurement flexibility because their measurement points are fixed. Once loops are buried in the ground, the system can only measure elapsed time between those two points. This is an important limitation as it does not allow the system to record any portion of the customer's wait that precedes the first loop. Moreover, any vehicle that enters the systems in a way that bypasses the first loop cannot be properly timed. Finally, any vehicle that exits the system in a way that bypasses the second loop cannot be properly timed.

Error recover is another limitation of drive-through timers of the second type. Specifically, such drive-through timers are prone to timing errors when vehicles fail to cross or trip both timing sensors. Because these systems assume vehicle continuity between the sensors, any vehicle that enters or leaves the line between the sensors causes a mismatch in the start and end times for the other vehicles in the queue. Since there is no way known to detect this error condition, incorrect timings will continue until the queue clears out and the system can be reset.

Drive-through timers are further limited by their inability to identify important exceptional events, like drive-offs. Drive-through service managers would benefit greatly from a system that could determine when drive-offs (i.e., vehicles that begin to move through the drive-through, but drive away before reaching the service point) occur and how long drivers waited before driving off. Because drive-through timers only measure vehicles at two specific points, the vehicles are basically invisible to the systems at all points in-between. Moreover, there is no way to disambiguate between a vehicle passing over a sensing point because it is traveling in the drive-through lane versus a vehicle that is passing over the sensing point because it is driving off.

Finally, drive-through timers have an inherent lack of flexibility in the events that may be employed to trigger their timers. Drive-through timers of the second type are started and stopped based strictly on the presence of an un-differentiable vehicle over the sensor position. Once installed, the drive-through manager cannot easily change the point at which the timers start and stop.

Drive-through timers of both types are limited in the event class that can be used to trigger the timers. Drive-through timers of the first type are limited to start the timer upon a particular ordering event (i.e., the first button push of the POS) or upon a particular position event (i.e., the presence of a vehicle over the sensor) or the Boolean combination of the two. Drive-through timers of the first type are theoretically less limited in the event class that can be used to start or stop the timers as humans can be trained to press buttons upon recognizing more complex events. While recognizing that drive-through timers of the first type could theoretically overcome flexibility limitations, pragmatically, humans are limited in their consistency—boredom and distraction inherently limit human performance. Further, drive-through timers of the second type are inherently limited to starting and stopping timers based solely on positional information.

Neither drive-through timer is capable of expanding to measurements of more complex actions or driving behaviors such as "timing from the first time that the vehicle stops while in the lane until the first time that the vehicle stops in front of the order board".

Moreover, neither drive-through timer is capable of providing constant knowledge of the queue state so that drive-through managers can react in real-time to:

Prioritize drive-through service—Managers could reduce the length of the queue or react to growing wait times by prioritizing the fulfillment of drive-through service over other service queues. Note that this management action is simple prioritization with no change to labor allocation;

Allocate or re-allocate labor—Managers could change labor allocation at the drive-through, either through improved scheduling (i.e., scheduling based on more quantitative information about drive-through performance trends) or by temporarily re-allocating labor in real-time in reaction to poor drive-through performance (i.e., wait times are growing, so reallocate more service personnel to attend to drive-through tasks);

Know when prodding (of service personnel) will help—Management prodding loses its effect when it happens too often and/or without justification. Accurate measurements of the queue state enable managers to know when to prod and to be able to show crew members why it's important to do so now. A running clock or a flashing light indicating too many vehicles in the drive-through add urgency to the manager's orders for faster service; and/or Identify and react to exceptions—Managers are constantly distracted. A system that could provide constant knowledge of the queue state could enable managers to react to service deficiencies in real-time to, therefore, minimize service disruptions.

If such queue state information were available, managers could also make use of such information to improve their labor scheduling practices. They might, for example, review wait times versus labor statistics throughout the day; look for patterns in unacceptable wait time performance; and review labor allocation in light of this new information.

Moreover, if such queue state information were available, managers could make further use of such information to develop better "queue service models"—i.e., understand the performance limitations of current service practices and make process changes. Queue state analyses could be performed in real-time to identify "bottlenecks" or "frustration points" in the queue model, thereby allowing managers to concentrate their management time on resolving specific service issues.

This last point is especially important to cost-effective training. The ability to understand the specific points in the queue service model that limit service speed or quality means that corporate training funds can be narrowly focused on resolving specific problems, rather than being spent on general service training.

Lastly, if such queue state information were available, managers could use drive-off information derived from such information to improve their target performance times. Drive-offs provide the managers with some information on the limitations of their customer's patience. By maintaining a database of drive-off events, managers could learn about the willingness of their local clients to wait in queues of given queue length, elapsed wait time, and other factors.

Counter Service:

Quick-service restaurants require people to queue up in order to obtain access to a product or service. Counter service, in this sense, is meant to indicate a single queue or two or more parallel queues, as are normally seen in QSRs.

Counter service managers have the same basic business objectives as drive-through service managers: to maximize throughput (i.e., sales revenues during busy periods) at the lowest possible labor costs, while maintaining acceptable customer service levels.

Counter service managers might be less concerned than drive through managers about the impact of queue length on a shopper's decision to frequent their store, as many shoppers are felt to have made a higher "commitment" once they've come into the store. The sunk cost of having already parked and entered the store, combined with the anticipated future cost of getting into another busy queue at another busy store, discourages customers from switching.

Counter service managers can intercede to improve counter service in several ways:

Open or close a register—Counter service areas, unlike the drive-through, frequently have more than one service register. Managers can decide, in real-time, to temporarily open a second register to relieve a growing queue;

Labor Scheduling and Labor Assignment—Front counter managers schedule their counter labor in anticipation of weekly demand projections. This non-real-time approach defines the front counter labor that will be available to meet demand. Counter managers can also re-task their labor force in real-time by shifting crew members from one job assignment to another to best meet real-time changes in demand;

Prodding—Service managers oversight employee performance in real-time so that they can coach, prod, push, encourage, identify and remove hurdles, respond to unusual events, and otherwise increase the overall crew's ability to execute against their tasks;

Problem Resolution—Counter service managers identify and resolve problems that hold back the flow of the queue. Problems like price checks; consumer questions; or employee difficulties with point-of-sale (POS) systems can slow the service lines unnecessarily.

Unlike drive-through service, where timers are a readily available technology, albeit problematic, there is/are no known means to address counter service measurement needs. The principal difference between drive-through and counter service is: drive-throughs are occupied by large, heavy, slow moving metallic objects (e.g., cars, trucks, and other like vehicles) that maintain a relatively simple straight line; counter service areas are occupied by several people in far more complex states of motion (especially children) and often with no real queue structure.

For optimal operation of a QSR, counter service management requires constant knowledge of the queue state so that managers can react in real-time to:

Open or close a register—Managers can open additional counter service registers to accommodate growing traffic. If predictive information were available, managers could open registers in advance of actual demand changes—further helping to reduce consumer wait times;

Prioritize counter service—Managers could react to growing wait times by prioritizing the fulfillment of counter service over other service queues. Note that this management action is simple prioritization with no change to labor allocation—i.e., no one changes job positions;

Allocate or re-allocate labor—Managers could change labor allocation at the counter, either through improved scheduling (i.e., scheduling based on more quantitative information about counter performance trends) or by temporarily re-allocating labor in real-time in reaction to poor counter performance (i.e., wait times are growing, so reallocate more service personnel to attend to counter tasks);

Know when prodding will help—Management prodding loses its effect when it happens too often and/or without justification. Accurate measurements of the queue state enable managers to know when to prod and to be able to show crewmembers why it's important to do so now; and/or Identify and react to exceptions in real-time to minimize the service disruption.

Take-Out/Pull-Ahead Service:

Both QSR and fast-casual restaurants often designate specific parking spaces or pull-ahead areas for customers who are waiting to either pick-up a previously placed take-out order, or have been asked to pull ahead from a drive-through pick up window because their food is not yet ready. In the case of take-out parking spaces, employees watch for customers to arrive and bring products out. In the case of pull-ahead spaces, employees run food out to the customer as soon as it is ready.

Fast-casual restaurants compete with quick-service restaurants by offering curbside or take-out service as a means of providing the same "fast" service with better quality food. Designated parking spaces are a means of providing additional convenience to the consumer to attract additional sales opportunities from those patrons, such as busy mothers or senior citizens, who don't want to get out of their vehicles.

Quick-service restaurants use pull-ahead spaces to ensure that the drive-through lane does not stop because food is not ready for the patron at the drive-through pick-up window. The pull-ahead space may simply be an unmarked space along the drive-through curb; or it may be a space designated by a box, a large circle, or some other demarcation; or it may be an actual parking space designated for drive-through pull-ahead customers.

Pull-aheads are caused by production anomalies—production was not able to deliver the customer's food in enough time to ensure that that customer's wait didn't begin to impact other customers in the drive-through queue.

Take-out service requires managers or their designees, who are likely to be distracted by other tasks, to keep watch on designated parking spaces and send an employee out with the consumer's food. The manager must make a decision about how much scarce labor to allocate to watching for arriving customers, versus performing other service tasks.

Drive-through service managers must determine (i) when to ask drive-through patrons to move their vehicles into pull-ahead spaces; and (ii) when to send employees out to deliver the patron's food.

The state of the art in take-out or pull-ahead service management is manual management—i.e., people assigned to the task of monitoring parking spaces (either directly or through a camera system) and sending employees to deliver product. There are no known technology solutions to this management problem.

It would, therefore, be desirable to overcome the above problems by providing a system and a method for real-time electronic determination of: the effectiveness of customer service; the prediction of service demand needs; and the identity of real-time service problems. Still other problems the system and method overcome will become apparent to those of ordinary skill in the art upon reading and understanding the following Detailed Description.

SUMMARY OF THE INVENTION

Embodiments of measurement and monitoring applications based on 2D image processing techniques are disclosed. 2D image processing techniques are disclosed because, in practice, 2D cameras are relatively inexpensive. Moreover, because there is little pricing differential between a Black-and-White and a color camera, it is envisioned that 2D color cameras, desirably a 2D color CCD-type cameras, can be used so that color-based techniques can be exploited.

However, the general solution disclosed herein—object detection and tracking—could also be performed in 3D or with other sensors that span the frequency range of known passive or active radiative sensors including, without limitation: millimeter wave radar; microwave radar; lidar; camera configurations such as stereo vision, n-ocular vision; as well as mechanical-wave sensors such as sonar, piezoelectric, etc. It is envisioned that one skilled in the art can choose any suitable and/or desirable sensor in light of the application requirements.

The selection of 2D color cameras necessitates the use of 2D image processing techniques. The vision-based component techniques described herein are familiar to those skilled in the art.

The 2D image applications disclosed utilize the combination of up to four basic techniques:

Motion Detection—These techniques locate segments of the image where pixel changes between image frames indicate the presence of objects in motion;

Foreground Extraction—These techniques separate an image into a set of foreground pixels (containing the objects of interest as a subset) and so-called background pixels (everything else).

Object Detection—These techniques determine which groups of image pixels correspond to the object of interest—often after foreground extraction and/or other image filtering techniques have been applied; and Object Tracking—These techniques track objects in motion from image frame to image frame.

The systems described herein employ the output of the vision processing system to make decisions about the objects of interest. The decisions include: detecting the presence of objects; a count of objects; or the timing of objects as they move from state to state.

Decisions, described herein are based on either scene information or object information. Scene information indicates the state of the overall image—for example, if enough pixels within some region of the image corresponding to the space in front of a grill are occupied, then this information is sufficient to indicate the presence of a restaurant worker in front of the grill. Object information, by contrast, indicates the state of a relevant object within the scene i.e., the presence of a specific object—for example, an object moving through a specific part of the scene may be tracked to determine that a vehicle has left a known parking space.

More specifically, a method of service management is disclosed comprising (a) providing a radiative sensor positioned to observe an area of interest; (b) electronically acquiring from the radiative sensor at least one frame of data of the area of interest; (c) electronically processing said acquired frame of data to determine the presence or absence of at least one object in the area of interest; (d) based on the presence or absence of the at least one object in the area of interest determined in step (c), electronically causing (1) an alert to be generated in response to also electronically detecting a state of the at least one object in the area of interest; (2) an alert to be generated in response to also electronically detecting a state of another object in another area of interest; (3) a timer to initiate or terminate counting a period of time in response to also electronically detecting the same state or a different state associated with the at least one object; and/or (4) data to be stored.

Each state can comprise one or more of the following: the presence of the object at a specific location in the area of interest; the state of a customer order associated with the object; the state of fulfillment of a customer order associated with the object; the state of motion (stopped or moving) associated with the object; and the state of the location of the object in a sequence (or group) of objects.

Steps (b), (c) and (d) can be performed substantially in real time. Steps (b), (c) and (d) can be repeated a plurality of times.

The other object in the other area of interest can be electronically detected via the radiative sensor or another radiative sensor.

The area of interest can be a counter service location; the object can be a service person; the other object can be a patron; and the alert is generated when the service person is not present and the patron is present.

The area of interest can be a drive-through lane; the object can be a vehicle; the timer can initiate counting the period of time upon movement of the vehicle to a first state (e.g., position) in the area of interest; and the timer can terminate counting the period of time upon movement of the vehicle to a second state (e.g., position) in the area of interest.

The method can further include maintaining a real-time count of each vehicle in the drive-through lane.

The area of interest can be a parking space; the object can be a vehicle; the timer can initiate counting the period of time when the vehicle enters the parking space; and the timer can terminate counting the period of time when the vehicle enters the parking space. The alert can be generated when the vehicle enters exits the parking space.

The means for electronically processing can utilize any suitable and/or desirable technique, such as a background subtraction technique, to determine the presence or absence of the at least one object in the area of interest.

Also disclosed is a service management system comprising a radiative sensor positioned to observe an area of interest; means for electronically acquiring from the radiative sensor at least one frame of data of the area of interest; means for electronically processing said acquired frame of data to determine the presence or absence of at least one object in the area of interest; and means for electronically causing (1) an alert to be generated in response to also electronically detecting a state of the at least one object in the area of interest; (2) an alert to be generated in response to also electronically detecting a state of another object in another area of interest; (3) a timer to initiate or terminate counting a period of time in response to also electronically detecting the same state or a different state associated with the at least one object; and/or (4) data to be stored.

Each state can comprise one or more of the following: the presence of the object at a specific location in the area of interest; the state of a customer order associated with the object; the state of fulfillment of a customer order associated with the object; the state of motion (stopped or moving) associated with the object; and the state of the location of the object in a sequence (or group) of objects.

The means for electronically processing can utilize any suitable and/or desirable technique, such as a background subtraction technique, to determine the presence or absence of the at least one object in the area of interest.

The area of interest can be a counter service location; the object can be a service person; the other object can be a patron; and the alert can be generated when the service person is not present and the patron is present.

The area of interest can be a drive-through lane; the object can be a vehicle; the timer can initiate counting the period of time upon movement of the vehicle to a first state (e.g., position) in the area of interest; and the timer can terminate counting the period of time upon movement of the vehicle to a second state (e.g., position) in the area of interest.

The system can further include maintaining a real-time count of each vehicle in the drive-through lane.

The area of interest can be a parking space; the object can be a vehicle; the timer can initiate counting the period of time when the vehicle enters the parking space; and the timer can terminate counting the period of time when the vehicle exits the parking space.

The alert can be generated when the vehicle enters the parking space.

BRIEF DESCRIPTION OF THE DRAWINGS

FIG. 1 is a block diagram of a system for electronically determining the effectiveness of customer service and for estimating impending food product demand at a quick-service and/or fast-casual restaurant;

FIG. 2 is a block diagram of a method of processing frames of data acquired by the system of FIG. 1;

FIG. 6 is a block diagram of a method of take-out/pull-ahead service management that utilizes the system of FIG. 1.

DETAILED DESCRIPTION OF THE INVENTION

Figure 3:
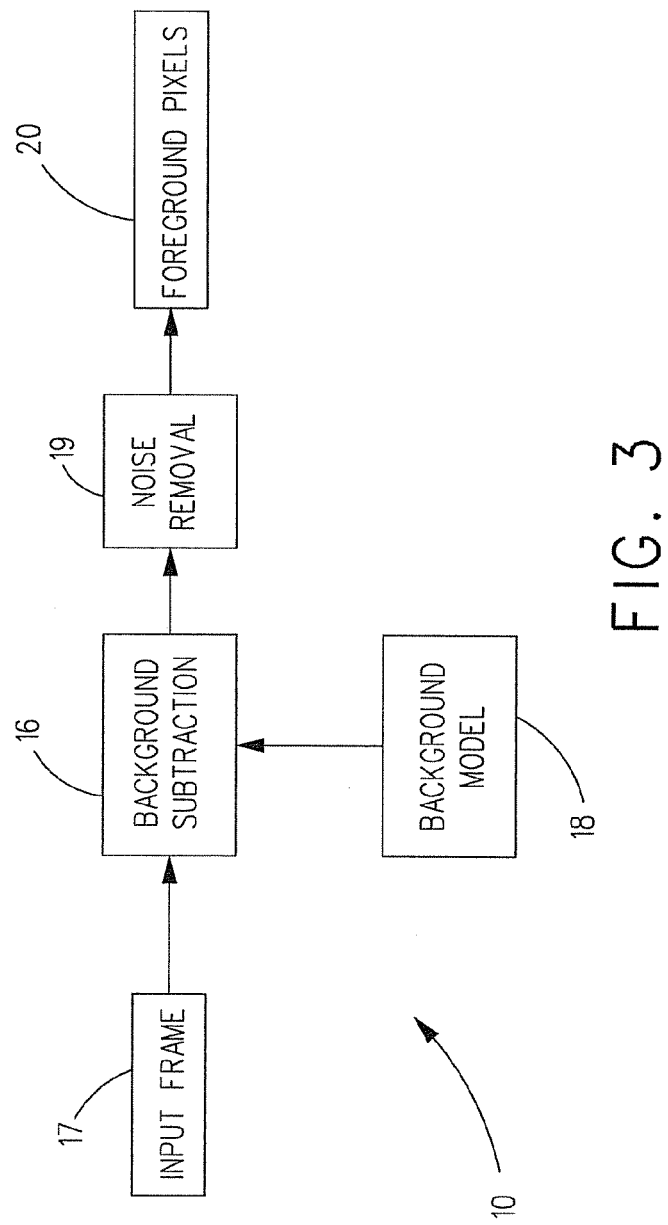
FIG. 3 is a block diagram of an object detection step of the method shown in block diagram form in FIG. 2.

With reference to FIG. 1, a system for, among other things, real-time electronic determination of: the effectiveness of customer service at a QSR and/or a fast-casual restaurant; the prediction of service demand needs at said restaurant(s); and the identity of real-time service problems at said restaurant(s) includes a sensing system 1 which observes one or more areas of interest. Sensing system 1 electronically captures real-time data (images or views) of the observed area of interest and extracts therefrom (1) a scene 2 (e.g., a degree of occupancy in a front-counter queue) (2) relevant objects 3 in the scene (e.g., vehicle trajectory information), or (3) both. This information is processed by a decision module 4 to generate events 5 (e.g., "customer waiting") which are passed in real-time to a store management system 6 which time-tags some or all of the events and enters the tagged events into a data storage 7 for further off-line data mining. Store management system 6 may be implemented by suitable and/or desirable computer, such as a standard PC-class computer, that resides: at the restaurant(s), resides remote from the restaurant(s), or is distributed between the restaurant(s) and one or more remote location.(s)

Sensing system 1 can include one or more stationary cameras 8 positioned outside the store and/or within the store to capture frames of real-time data. While the use of one or more cameras will be described hereinafter, it is envisioned that each camera can be replaced with any suitable and/or desirable active or passive radiative sensor, or combinations of active and/or passive radiative sensors, that can be utilized for electronically capturing real-time data (images or views) of the observed area of interest. Accordingly, the description herein of camera(s) 8 for electronically capturing real-time data (images or views) of an observed area of interest is not to be construed as limiting.

With reference to FIG. 2 and with continuing reference to FIG. 1, a processing algorithm implemented by store management system 6 for processing frames 9 of data captured by each camera 8 includes an object detection module 10. Object detection module 10 identifies areas in a scene likely to be occupied by foreground objects such as people, cars, etc. In order to discriminate between foreground objects relevant to the system and the (mostly static) background, object detection module 10 uses a previously acquired or determined background model 11. For certain applications, e.g. the front-counter demand predictor (described in greater detail hereinafter), the approximate position and extent of foreground areas is sufficient. For other applications, such as the drive-through monitoring system, more detailed object information is necessary. In these cases foreground objects identified by object detection module 10 are associated across frame boundaries using an object-tracking module 12.

Object-tracking module 12 uses a list of candidate objects 13 created by the object detection module 10 along with information of previously detected and/or tracked objects 14 to establish current foreground object position(s) 15. Object detection and object tracking will be described in greater detail hereinafter. The data acquired by camera(s) 8 may be augmented with the additional output of lower level sensors, such as a cash-drawer sensor or a photoelectric barrier, in any manner deemed suitable and/or desirably by one skilled in the art.

With reference to FIG. 3 and with continuing reference to FIGS. 1 and 2, since sensing system 1 uses stationary camera(s) 8, the appearance of the scene background (e.g. the ground, buildings, and to some extend vegetation) observed by each camera 8 changes little from frame to frame. New foreground objects (i.e., cars or people) can therefore be identified by subtracting out the background. To this end, object detection module 10 implements a background subtraction module 16 that compares each input frame 17 to a previously determined background frame model 18 in a process known in the art as background subtraction. A number of algorithms have been proposed in the literature for background subtraction. These algorithms typically specify a statistical model of the intensity variation of each pixel in the background scene (imaged without foreground objects) to capture natural variations due to sensor noise, slow illumination changes, vegetation moving in the wind, etc.

For each newly acquired frame, background subtraction module 16 computes a numerical distance between the value of each pixel in the newly acquired frame and one or more pixels (for example, without limitation, the corresponding pixel) in the background model. Based on this distance, background subtraction module 16 determines if the pixel in the newly acquired frame differs significantly from the background model. If so, the pixel of the newly acquired frame is deemed to be a candidate foreground pixel. In a very basic method of performing background subtraction, a median filter is applied over a collection of background frames to derive the background model 18. Computationally more intensive methods model the distribution of intensities of each pixel using a Gaussian distribution, a mixture of Gaussian distributions or a kernel estimator. These methods are all well known by those skilled in the art and will, therefore, not be discussed in greater detail herein.

Since background subtraction is applied separately for each pixel of each newly acquired frame, the result background subtraction image typically contains a considerable amount of noise. This noise can be removed by a noise removal module 19 that implements standard image processing techniques including, without limitation, image filtering, masking, region of interest determination and/or connected component analysis with size thresholding. The pixels remaining after processing by noise removal module 19 are labeled as foreground pixels 20.

Next, automated service management appropriate to quick service and other restaurants; as well as several embodiments of specific implementations of automated service managers employed within segments of these industries will be described.

The embodiments described hereinafter use data to either: (i) detect the simple presence of an object (i.e., a customer or a customer service person); (ii) to measure the effectiveness of customer service (i.e., calculate wait times, or monitor the number of customers in a queue); (iii) to predict service demand needs (i.e., the amount of resource that should be applied to meet demand); or (iv) to identify real-time service problems (i.e., a queue has stopped).

Drive-Through Service Management:

A drive-through service management embodiment performs the following functions:

Counts Vehicles—Maintains a count of the number of vehicles presently in the drive-through lane and/or some segment of the lane; and Times Vehicles—Generates consumer wait times between two events;

In this embodiment, one or more cameras 8 are mounted on the restaurant property in position(s) to face the drive-through lane whereupon vehicles (e.g., cars, trucks, and the like) in the drive-through lane are imaged, desirably from the side, for example, without limitation, from a distance of approximately 50 feet and from an elevation of approximately 25 feet. Generally, this requires placing the camera(s) on the borders of the restaurant parking lot, facing in toward the restaurant. However, this is not to be construed as limiting the embodiment, since it is envisioned that each camera can be positioned at any suitable and/or desirable location that facilitates viewing of each vehicle in the drive-through lane. For ease of installation, most cameras were mounted to the standard mercury vapor lamps found in a conventional restaurant parking lot. In one application, a camera was mounted to a temporarily installed pole mount.

Image frames acquired by these cameras 8 are collected by store management system 6 and written to data storage 7. Store management system 6 utilizes object detection module 10 to apply one or more 2D image processing techniques to the acquire frames to (i) extract vehicles from the scene viewed by each camera; (ii) track relevant vehicles—e.g. those in the drive-through lane; (iii) reject non-relevant vehicles—e.g. those passing by or not in the drive-through lane; (iv) maintain a count of the vehicles in the drive-through lane; (v) time each vehicle's duration in the drive-through lane; and (vi) classify any vehicle that leaves the drive-through lane prior to reaching the order board (where patrons place orders in the drive-through lane) as a "drive-off".

Each vehicle's duration in the drive-through lane can be defined as the time elapsed during each vehicle's transit between two lines or points in the acquired images. Alternatively, each vehicle's duration in the drive-through lane can be defined as the time elapsed from the moment that the vehicle first comes to a complete stop in the drive-through lane until the moment that the same vehicle pulls away from the drive-through order board.

Figure 4:
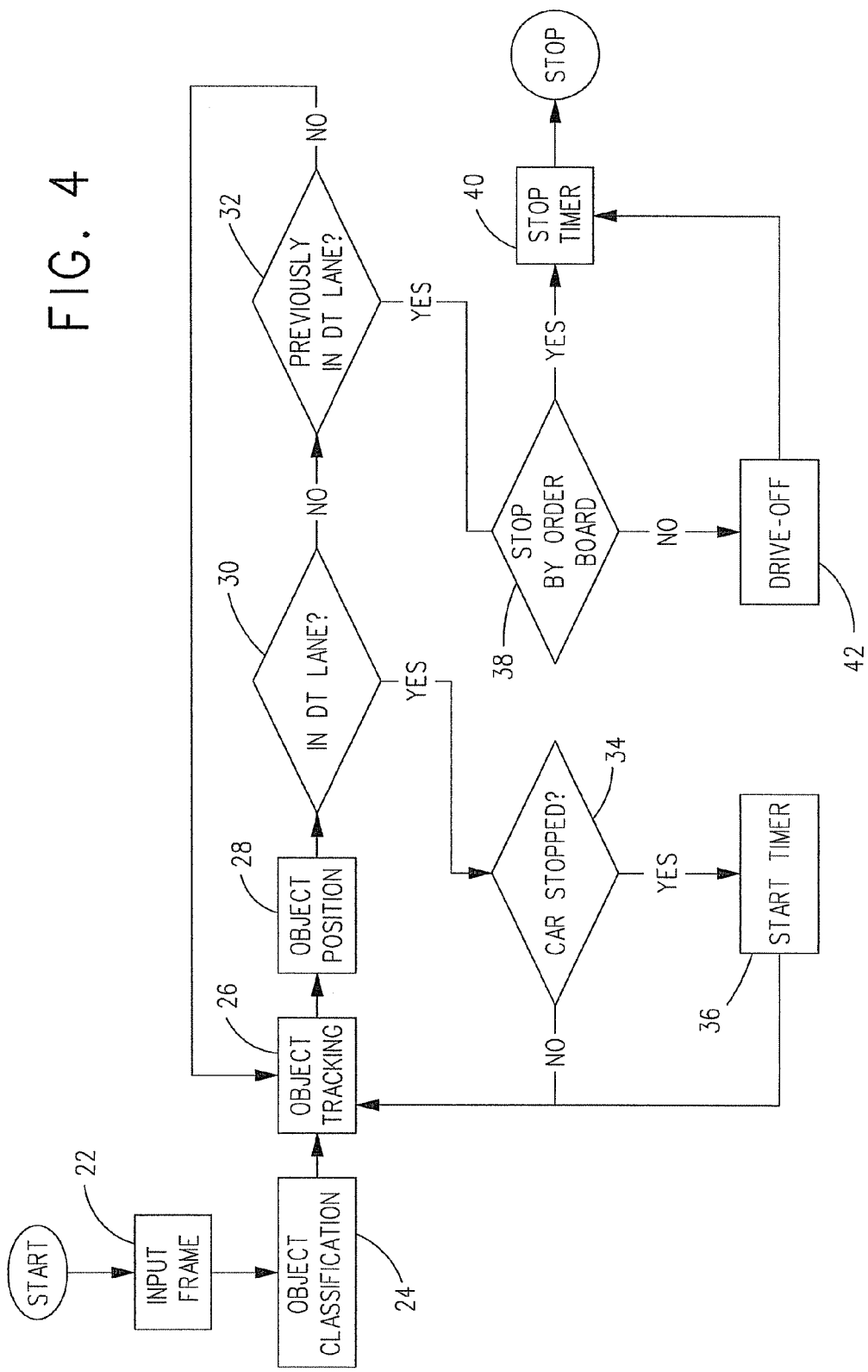
FIG. 4 is a block diagram of a method of object detection and tracking utilized by the system of FIG. 1.

With reference to FIG. 4 and with continuing reference to FIGS. 1-3, next, a method of object detection and tracking utilized by store management system 6 to identify relevant foreground objects and track their movement through one or more image frames will be described.

In step 22, an image frame is input into store management system 6. In step 24, the input image frame of step 22 is processed to determine the presence of newly determined foreground objects in the image and whether each newly discovered foreground object is a vehicle or a non-vehicle based on the object's shape (i.e., object detection and classification). In step 26, objects identified as vehicles are tracked. In step 28, the continuous position of each vehicle is tracked along with a complete track of previous locations of the vehicle in the image frames. In step 30, a decision is made if the tracked vehicle is in the drive-through lane. A vehicle is deemed to be in the drive-through lane if it stops in the relevant region of one or more image frames. This region is determined offline as part of a configuration process.

If it is determined that the vehicle is not part of the drive-through lane, a decision is made in step 32 if the vehicle was previously in the drive-through lane. If not, the method returns to step 26 where tracking of the vehicle continues. If the vehicle never enters the drive-through lane, steps 26, 28, 30 and 32 are repeated as needed for the vehicle until it exits the field of view of the one or more cameras 8 positioned to view the drive-through lane, whereupon no action is taken to classify the vehicle as being in the drive-through lane.

However, if, in step 30, it is determined that the vehicle is in the drive-through lane, the method advances to step 34 where a decision is made whether the vehicle has stopped in the drive-through lane. If the vehicle stops, the method advances to step 36 where a timer associated with the vehicle is started. As long as the vehicle remains in the drive-through lane, this timer accumulates time. Following step 36 or if it is determined in step 34 that the vehicle has not stopped in the drive-through lane, steps 26, 28 and 30 are repeated.

If, in an instance of step 30, it is determined that the vehicle is no longer in the drive-through lane, the method advances to step 32 where a decision is made whether the vehicle was previously in the drive-through lane. If so, the method advances to step 38 where a decision is made whether the vehicle has stopped by the order board. If so, the method advances to step 40 where the timer is stopped. If not, the method advances to step 42, where the vehicle is classified as a "drive-off", and then to step 40 where the timer is stopped.

Data storage 7 in FIG. 1 can house an application log which stores the total amount of time (i.e., the time accumulated by the timer) each vehicle either (1) spent in the drive-through lane prior to driving off or (2) spent in the drive-through lane prior to stopping at the order board. If the occupant(s) of the vehicle place an order, the completed transaction information along with the total wait time can be entered into the application log. Also or alternatively, the time that a vehicle spends standing at the order board can be excluded from the wait time estimation.

Figure 5:
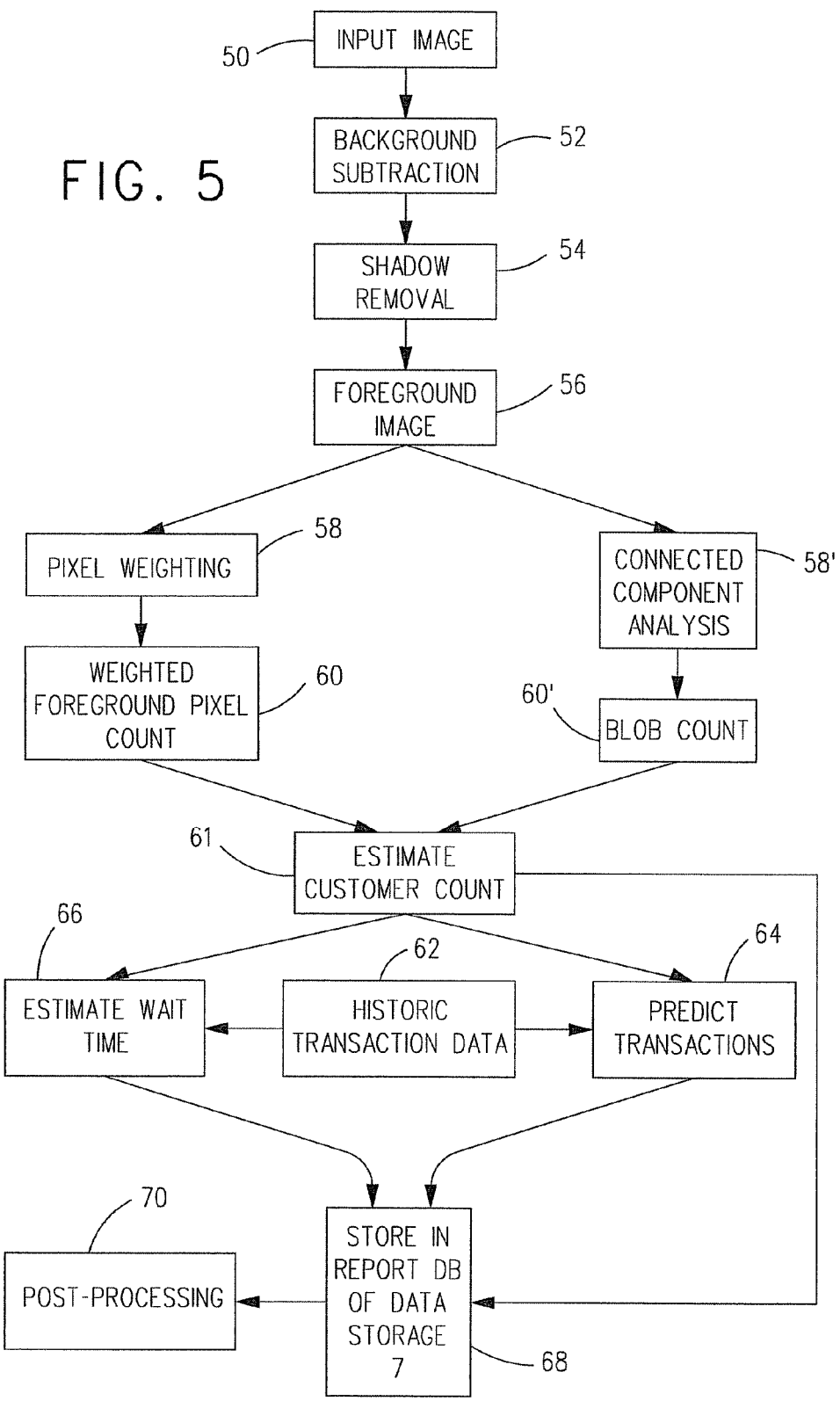
FIG. 5 is a block diagram of a method of front counter service management that utilizes the system of FIG. 1.

Front Counter Service Management:

With reference to FIG. 5 and with continuing reference to FIGS. 1-4, a front-counter service management embodiment can estimate impending food product demand based on "image occupancy" of "bio-mass" as described below.

In this embodiment, one or more cameras 8 are installed over a front-counter area such that the field-of-view of the camera(s) cover(s) the general area where customers queue up for service. It has been observed that mounting a camera in a vertical position (i.e., pointed straight down at the floor and at the tops of the heads of consumers) is advantageous as it significantly reduces occlusion of one consumer by another consumer, as naturally happens in the field-of-view of a camera mounted for, e.g., security applications. Occlusion here simply means that one consumer cannot be fully seen because they are standing fully or partially behind another consumer in the image.

Images collected from each camera 8 are processed by store management system 6 to generate an estimate of the portion of the image occupied by patrons, i.e., not the number of people, but the projection of their total surface area into the image. Herein this projection is called a "bio-mass' estimate. This estimate provides some indication of the amount of food product needed and/or the number of transactions that will occur at the front counter over the next several minutes.

In this embodiment, a conversion factor is formed between the bio-mass estimate and the expected number of transactions (or, alternatively, food product demand). There are many classical estimation methods available for generating the conversion factor. In one method, the "bio-mass' estimate is fitted to time-shifted transaction data through a least-squares estimate to arrive at the conversion factor. Store management system 6 may determine conversion factors in real-time so that updated conversion factors can be utilized.

In operation, store management system 6 multiplies the bio-mass estimate by a suitable conversion factor to arrive at a transaction demand estimate or a food product demand estimate. Real-time filtering may be used to reduce noise in the estimate as needed.

Multiplication of the bio-mass estimate by the conversion factor to determine a transaction demand estimate or a food product demand estimate may be used in parallel with the counting method used in the drive-through service management system discussed above to discover instances where the count may be artificially low because two or more people are standing too close together for connected component extraction methods to distinguish between or among them.

The same bio-mass estimate can be used along with time-stamped transaction information to compute an estimate for the wait time that customers entering the queue should expect. This information can be communicated to the manager in order to affect resource allocation or to the customer, similar to fixed markers used in e.g. amusement parks ("15 minutes from here").

A method of front counter service management in accordance with this embodiment includes step 50 where an image frame is input into store management system 6. Store management system 6 then executes steps 52, 54 and 56 where background subtraction (step 52) and shadow removal (step 54)) techniques are utilized to determine (step 56) the foreground objects in the scene of the image frame input in step 50. The method then advances to steps 58 and 60 where store management system 6 utilizes a pixel weighting mask to weight the pixels of the image frame (step 58), to account for influences of the camera perspective and limited object visibility at the perimeter of the image, and outputs a weighted pixel count (step 60). The weighting mask used in step 58 is computed automatically offline from training data in which all objects of a training set are tracked through the image.

Store management system 6 also executes step 58' wherein connected component analysis is performed on the foreground image obtained in step 56 to obtain an estimate of the number of connected foreground regions or blobs that store management system 6 outputs in step 60'. Using a domain model learned during a training session, in step 58', store management system 6 is able to reason about excessively large blobs corresponding to two or more people standing close together in the scene of the image frame.

The method then advances to step 61 where information from the weighted foreground pixel count determined in step 60 and the number of blobs in the image determined in step 60' are combined to obtain an estimate of the number of people in the scene. In step 62, historical data regarding previously recorded time-stamped transaction data from the restaurant's POS system is linked to historical data regarding previously recorded time-stamped estimates of the number of customers in the queue area. In step 64, the historical data linked in step 62 is utilized to compute the expected number of transactions for the current number of waiting customers. In step 66, this linked data is utilized to estimate the wait time for a customer joining the end of the queue. If desired, upon completion of steps 64 and 66, steps 50-66 can be repeated, as necessary, to compute the expected number of transactions for the current number of waiting customers and to estimate the wait time for a customer joining the end of the queue anew.

Optionally, the method can include step 68 and 70. In step 68, all data/information produced in steps 61, 64 and 66 is stored in a report database of data storage 7. In step 70, the information stored in the report database can be post-processed to compute minimum and maximum occupancy numbers, queue tendencies (increasing or decreasing traffic), hourly, daily, weekly, etc. averages and more.

Take-Out/Pull-Ahead Service Management:

With reference to FIG. 6 and with continuing reference to FIGS. 1-5, parking space monitoring is a general problem in the restaurant industry in which parking space occupancy is used to trigger a higher level action, such as alerting an employee to deliver food to a waiting customer or have a drive through customer whose food is not yet ready pull up (i.e., pull aside) to a designated parking space.

In this embodiment, one or more cameras 8 are mounted with the field of view of each camera 8 having an un-occluded view of parking space(s) of interest. Store management system 6 utilizes 2D image processing techniques to determine when a vehicle pulls into a space; note the elapsed time that the vehicle spends in the space; and note when the vehicle leaves the space. Additional 2D image processing techniques can be employed to determine when customers enter or leave the vehicle.

A method of take-out/pull-ahead management in accordance with this embodiment includes step 80 where an image frame is input into store management system 6. In step 82, a motion filter processes the input image frame. In steps 84 and 86, a direction of the motion and an absolute magnitude of the motion, respectively, are output by the motion filter. In step 88, the motion magnitude output in step 86 is compared to a predetermined vehicle threshold to determine if said motion magnitude exceeds said predetermined vehicle threshold. If so, the motion event is considered to be caused by a moving vehicle and the method advances to step 90—otherwise the method advances to step 92.

In step 90, the direction of the motion output in step 84 is processed to determine for the corresponding motion magnitude output in step 86, whether the vehicle is entering or exiting a parking space. Step 90 can optionally utilize the output of a space status step 94 where is it determined (via any suitable and/or desirable means or technique) whether the space is occupied or empty. This step 94 can help avoid false detection of the occupied or empty state of the space at any time prior, during or after the time the vehicle enters and exits the space.

In step 96, the classification whether the vehicle is entering or exiting the space made in step 90 is time-stamped. In step 98, this time-stamped classification is stored in a report database of data storage 7.

Returning now to step 88, if in step 88 the motion event is NOT considered to be caused by a moving vehicle, the method advances to step 92 wherein the motion magnitude output in step 86 is compared to a predetermined people threshold to determine if said motion magnitude exceeds said predetermined people threshold—indicative of people moving in the region of interest (in or near the parking space). If not, the method returns to step 80. Otherwise, the method advances to step 100 wherein the time since the last vehicle motion was detected in the region is utilized to classify the motion as either people leaving or entering the vehicle in the space. If no vehicle arrival event was detected prior to the occurrence of the motion ascribed to people in the region of interest, this information can be discarded. Otherwise, in steps 102 and 104 classification of people leaving and/or the classification of people entering the vehicle, respectively, is/are time-stamped. In step 98, each time-stamped classification of step 102 and/or step 104 is stored in the report database of data storage 7. Thereafter, the method returns to step 80.

Upon return to step 80 from any other step of the method, the method is repeated as needed in the manner discussed above to classify and time-stamp the entry and exiting of one or more vehicles into and from one or more parking spaces and to classify and time-stamp people entering and exiting one or more vehicles residing in parking spaces.

Store management system 6 can utilize these time-stamped classifications to determine the duration a vehicle has been in a space and/or whether patrons are exiting and entering the parked vehicle. This information in-turn can be utilized in the operation of the restaurant in any suitable and/or desirable manner. For example, store management system 6 can output a suitable alert to store personnel that a vehicle has entered a parking space. This alert can be utilized to advise store personnel of the entry of the vehicle into the parking space so that one or more suitable actions can be taken, such as, without limitation, intake a new order, deliver a completed order (e.g., deliver prepared food), etc. In another example, if store management system 6 determines substantially in real-time that the time duration a vehicle has been in a space exceeds a predetermined time duration, this fact can be communicated to store personal by store management system 6 in the form of a suitable alert. This alert can be utilized by store personal in any suitable an/or desirable manner, such as, without limitation, as a prompt to expedite service to the vehicle. The stored information can also be subject to off-line data mining to determine, for example, without limitation, service/personnel needs, average customer patience (e.g., the elapsed time between a vehicle entering a parking space and a person leaving the vehicle to expedite service), and the like.

Figure 7:
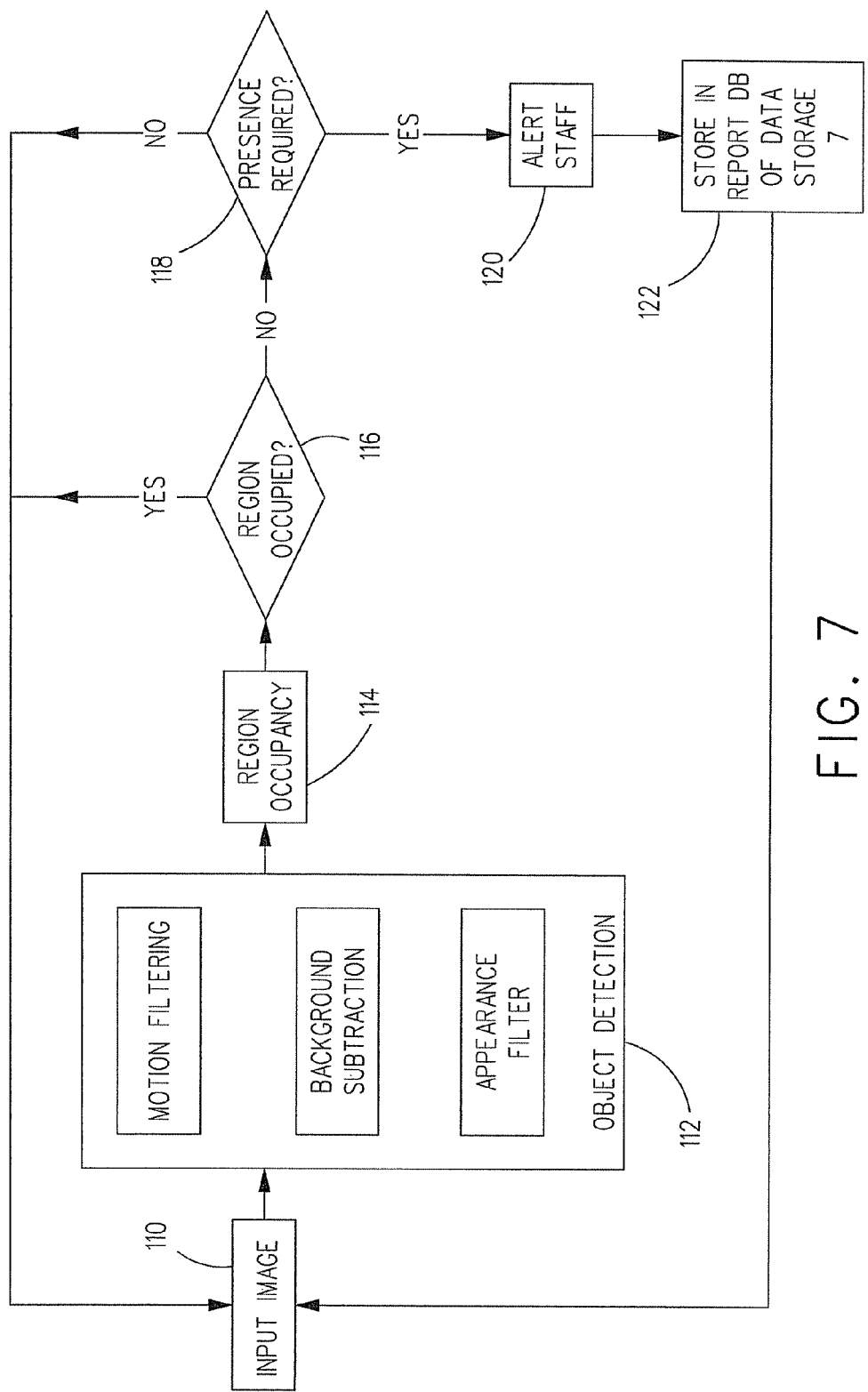
FIG. 7 is a block diagram of a method of employee station service management that utilizes the system of FIG. 1.

Employee Station Service Management:

With reference to FIG. 7 and with continuing reference to FIGS. 1-6, service management requires employees to be physically present at certain stations or locations within the retail environment to execute tasks within the "customer service chain"—i.e., the series of actions that must occur in order for a customer to receive a good or service. For example, in a restaurant the service chain begins with order-takers at the front-counter; moves to the kitchen employees who prepare the food; to the service employees who bag the order and present it to the customer.

In this embodiment, one or more cameras 8 are each mounted with its field-of-view covering one or more desired service locations. Store management system 6 utilizes 2D image processing techniques to detect the presence or absence of employees in these service station locations.

A method of employee station management in accordance with this embodiment includes step 110 where an image frame is input into store management system 6. In step 112, store management system 6 performs object detection, namely, a combination of motion filtering, background subtraction and appearance filtering for detecting objects, such as, without limitation, objects of predefined color, corresponding to store personal (e.g., wearing a certain colored uniform). Any objects detected in step 112 are output in step 114. In step 116, a decision is made based on the number and location of objects output in step 114 if a certain region of the image is occupied (e.g., by store personal). If so, the method returns to step 110. If not, however, the method advances to step 118 where a decision is made whether the presence of store personnel is needed. This decision can be made with reference to, for example, without limitation, an estimate (e.g., the bio-mass estimate) of patrons at a service counter location, such as, without limitation, the front of the cash register or receiving an order for a food item produced in a specific area of the kitchen. If the decision in step 118 is that store personnel is/are needed, the method advances to step 120 where store management system 6 causes a suitable alert to be generated. This alert can be utilized by store personal in any suitable an/or desirable manner, such as, without limitation, as a prompt that customers are present at a the service counter. If the decision in step 188 is that store personnel is/are NOT needed, as might be the case where a sufficient number of store personnel are already present in or near the service counter, the method returns to step 110. Alerts generated in step 120 are time-stamped and stored in a report database of data storage 7 in step 122 for subsequent retrieval and analysis to determine, for example, without limitation, service/personnel needs, the service performance of personnel, and the like.

In summary, disclosed herein is use of 2D and/or 3D radiative sensors to measure drive-thru state in real-time. Sensors can include, but are not limited to color and/or black & white cameras; stereo vision, n-ocular vision, IR cameras, and other passive radiation sensors; scanning lasers, lidar, radar and other active radiation sensors; sonar & other mechanical wave sensors. State includes, but is not limited to: detection of one or more objects; occupancy estimate—i.e. an estimate of the amount of space taken up by the objects without necessarily calculating the number of objects that take up the space; count of the number of objects (count may be absolute or relative—i.e. count exactly N objects or simply report that N is greater than, less than, or approximately M); entrance state condition—i.e. the conditions of entrance to the drive-thru queue: for example entrance from one of (parking lot; highway; entrance 1; entrance 2; etc.); exit state condition—i.e. exit to one of (parking lot; highway; etc.); order state condition—i.e. whether or how the customer placed an order: (one or more of order board 1; order board 2; drive-off; no order); order fulfillment condition—i.e. whether or how the customer received their food order: one or more of (normal; pulled-ahead; food unavailable; wrong order; drive-off; etc.); stop motion events—i.e. each time that a vehicle comes to a complete stop in the drive-thrt; time stamped events—i.e. the time at which any of the foregoing states occurs may be time stamped; and elapsed time—i.e. the elapsed time between any pair of time stamped events.

Also disclosed herein is the use of 2D and/or 3D radiative sensors to measure front (service) counter state. Sensors can include, but are not limited to color and/or black & white cameras; stereo vision, n-ocular vision, IR cameras, and other passive radiation sensors; scanning lasers, lidar, radar and other active radiation sensors; sonar & other mechanical wave sensors. State includes, but is not limited to: detection—detection of one or more objects; occupancy estimate—i.e. an amount of space taken up by the objects without necessarily calculating the number of objects that take up the space; count—of the number of objects (count may be absolute or relative—i.e. count exactly N objects or simply report that N is greater than, less than, or approximately M); entrance state condition—i.e. the conditions of entrance to the front counter queue: for example entrance from one of (door 1; door 2; etc.); exit state condition—i.e. exit to one of (eating area; outside; bathrooms; etc.); time stamped events—i.e. the time at which any of the foregoing states occurs may be time stamped; and elapsed time—i.e. the elapsed time between any pair of time stamped events;

Also disclosed herein is the use of 2D and/or 3D radiative sensors to monitor employee state. Sensors can include, but are not limited to color and/or black & white cameras; stereo vision, n-ocular vision, IR cameras, and other passive radiation sensors; scanning lasers, lidar, radar and other active radiation sensors; sonar and other mechanical wave sensors. State includes, but is not limited to: detection—detect whether there is an object in a specified FOV in the scene; entrance state condition—i.e. the conditions of entrance to the specified FOV, such as the direction from which the object entered; exit state condition—i.e. the conditions of exit from the specified FOV, such as the direction that the object exited; time stamped events—i.e. the time at which any of the foregoing states occurs may be time stamped; and elapsed time—i.e. the elapsed time between any pair of time stamped events.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of service management comprising:
   (a) providing a radiative sensor positioned to observe an area of interest;
   (b) electronically acquiring from the radiative sensor at least one frame of data of the area of interest;
   (c) electronically processing said acquired frame of data to determine the presence or absence of at least one object in the area of interest;
   (d) based on determining the absence of the object in the area of interest in step (c), electronically causing a human detectable alert to be generated in response to also electronically detecting a presence of another object in another area of interest, wherein the other object in the other area of interest is electronically detected via the radiative sensor or another radiative sensor, and wherein:
   the area of interest is a service counter;
   the object is a service person;
   the other object is a patron; and
   the alert is generated when the service person is absent and the patron is present.

2. The method of claim 1, wherein steps (b), (c) and (d) are performed substantially in real time.

3. The method of claim 1, further including repeating steps (b), (c) and (d) a plurality of times.

4. The method of claim 1, wherein background subtraction is utilized in step (c) to determine the presence or the absence of the object in the area of interest based on a background of the area of interest observed by the radiative sensor in the absence of any object in the area of interest.

5. The method of claim 1, wherein the other area of interest is the service counter.

6. A service management system comprising:
   a radiative sensor positioned to observe an area of interest;
   means for electronically acquiring from the radiative sensor at least one frame of data of the area of interest;
   means for electronically processing said acquired frame of data to determine an absence of at least one object in the area of interest; and
   means for electronically causing a human detectable alert to be generated in response to also electronically detecting a presence of another object in another area of interest, wherein the other object in the other area of interest is electronically detected via the radiative sensor or another radiative sensor, and wherein:
   the area of interest is a service counter;
   the object is a service person;
   the other object is a patron; and
   the alert is generated when the service person is absent and the patron is present.

7. The system of claim 6, wherein the means for electronically processing utilizes background subtraction to determine a presence or the absence of the object in the area of interest.

8. The method of claim 6, wherein the other area of interest is the service counter.

* * * * *

UNITED STATES PATENT AND TRADEMARK OFFICE
CERTIFICATE OF CORRECTION

| | | |
|---|---|---|
| PATENT NO. | : 8,254,625 B2 | Page 1 of 1 |
| APPLICATION NO. | : 11/933655 | |
| DATED | : August 28, 2012 | |
| INVENTOR(S) | : Robert Craig Coulter et al. | |

It is certified that error appears in the above-identified patent and that said Letters Patent is hereby corrected as shown below:

Column 20, Line 15, Claim 8, "method" should be -- system --

Signed and Sealed this
Eleventh Day of December, 2012

David J. Kappos
*Director of the United States Patent and Trademark Office*